(12) United States Patent
Laquai

(10) Patent No.: US 7,062,393 B2
(45) Date of Patent: Jun. 13, 2006

(54) POLYNOMIAL FIT FOR JITTER SEPARATION

(75) Inventor: Bernd Laquai, Stuttgart (DE)

(73) Assignee: Agilent Technologies, Inc., Palo Alto, CA (US)

( * ) Notice: Subject to any disclaimer, the term of this patent is extended or adjusted under 35 U.S.C. 154(b) by 64 days.

(21) Appl. No.: 10/774,265

(22) Filed: Feb. 6, 2004

(65) Prior Publication Data

US 2004/0250179 A1 Dec. 9, 2004

(30) Foreign Application Priority Data

May 22, 2003 (EP) .................. 03101485

(51) Int. Cl.
*G06F 3/05* (2006.01)
(52) U.S. Cl. ............... 702/69; 702/66; 702/67; 702/73
(58) Field of Classification Search .......... 702/176, 702/179, 183, 189, 190, 191, 66, 67, 69, 702/73; 370/338; 708/300; 709/251
See application file for complete search history.

(56) References Cited

U.S. PATENT DOCUMENTS

| | | | | |
|---|---|---|---|---|
| 6,167,359 A | * | 12/2000 | Demir et al. ............. | 702/191 |
| 6,298,315 B1 | | 10/2001 | Li et al. ................. | 702/180 |
| 6,597,727 B1 | * | 7/2003 | Philips et al. ............ | 375/147 |
| 6,782,404 B1 | * | 8/2004 | Choudhary ............... | 708/300 |

OTHER PUBLICATIONS

T11.2/Project 1316-DT/REV 10.0: "Fibre Channel—Methodologies for Jitter and Signal Quality Specification—MJSQ" Secretariat International Committee For Information Technology Standardization, Mar. 10, 2003, XP002260650, Washington, DC, Entire Document.

Leclerc O et al, "Synchronously Modulated 1-15 Solution Systems: A Simple Analysis of Timing-Jitter Statistics and Bit Error Rate" OFC, 1998, Washington, DC, ISBN: 1-55752-521-8, pp. 290-291.

* cited by examiner

*Primary Examiner*—Marc S. Hoff
*Assistant Examiner*—Felix Suarez

(57) ABSTRACT

A method for determining the amount of deterministic jitter and random jitter in a digital signal having transitions between logical levels, the method comprising the steps of: providing said digital signal, determining a plurality of bit error rate values, each bit error rate value being associated with one of a plurality of successive timing points, and each bit error rate value being derived from a comparison of a result of a detection of a transition occurring in the digital signal cumulatively prior to its associated timing point with an expected signal, applying a polynomial fit in time to said plurality of bit error rate values associated with said timing points for determining a number of polynomial coefficients of said polynomial fit, and deriving the amount each of said deterministic and said random jitter from said polynomial coefficients.

15 Claims, 3 Drawing Sheets

POLYNOMIAL FIT FOR JITTER SEPARATION

This application claims benefit of the earlier filed European Application No. EP 03101485.5, Filed May 22, 2003.

BACKGROUND OF THE INVENTION

The present invention relates to jitter analysis.

Characterization of the transient behavior of e.g. high-speed digital circuits, i.e. the transition of a digital signal from one logical state/level to another logical state/level, has become growingly important for designing as well as manufacturing such digital circuits. With a continuously increasing level of SOC (system on a chip) integration multiple transistors switch at the same time thereby disadvantageously influencing timing characteristics of the signals generated by means of switching noise. Further, electrical fields generated by nearby clock distribution lines, etc. can also cause timing instabilities such as jitter. Accordingly, an amount of jitter that can be tolerated or that characterizes the transmission quality, e.g., of an IO-device is used as a figure of merit in specifications or standardizations.

ITU-T G.701 defines jitter as short-term non-cumulative variations of the significant instants of a digital signal from their ideal positions in time. The significant instant can be any convenient, easily identifiable point on the signal such as the rising or falling edge of a pulse or the sampling instant. By plotting the relative displacement of the instants within a real pulse train that has some timing jitter with respect to an ideal pulse train, the so-called jitter time function can be obtained. Alternatively, the jitter spectrum can be displayed in the frequency domain in order to provide jitter analysis. In a probabilistic approach jitter-histograms showing the likelihood for a transition can be established and analyzed.

In order to characterize devices with respect to jitter semiconductor manufacturers expect to use measurement equipment that is able to separate different types of jitter in order to allow an identification of sources of error and to provide further improvements of product quality. In particular, it is generally desirable to separate random jitter (RJ) from deterministic jitter (DJ). However, existing techniques such as that disclosed, e.g., in Li, M. P., Wilstrup, J., Jessen, R., Petrich, D. in: "A New Method for Jitter Decomposition through its Distribution Tail Fitting", Proc. Intl. Test Conf., pp. 788–794 (1999) are very time consuming, need many measurements to be taken per data point and therefore do not meet the requirements of high volume production.

SUMMARY OF THE INVENTION

It is an object of the invention to provide improved jitter separation. The object is solved by the independent claims. Preferred embodiments are shown by the dependent claims.

According to the present invention, a bit error rate function being obtained by means of measurement using, e.g., a commonly available bit error rate tester is analyzed to separate and determine the amount each of deterministic and random jitter. For this purpose a plurality of bit error rate values are first measured as a function of compare time in a bit time interval. Successive timing points are selected each therefore. The term "plurality" may include the number of two, three or a larger count of timing points.

As explained in detail, e.g. in NCITS T11.2/Project 1230 "Fibre Channel—Methodologies for Jitter and Signal Quality Specification", Rev. 5.0, Feb. 12, 2002, a bit error rate (BER) represents a cumulative probability of a transition causing an error due to jitter. To determine a BER, a sample point in time is usually swept along the bit time axis with each measurement collecting the events of a transition of a digital signal level prior to the center of the data eye and the results are then compared with expected values. This is valid if one tests for the decreasing data eye from the "left side" of a bit window. The opposite side of the bit time interval can similarly be tested by collecting any transition event occurring after the current timing point under investigation until a sufficient time after the bit window has ended and then—again—comparing said results.

Once the bit error rate values are obtained for the respective timing points a polynomial function is fit to the data obtained on each side of the data window. A perception underlies the invention, that due to its random jitter portion particularly the cumulative bit error rate function may be well represented by a polynomial function, e.g., of limited order not only in its deep tail, but also at moderate time distances from an expected, ideal transition.

Thus, according to one aspect of the invention, measuring bit error values at such timing points, which will provide BER values lying substantially within the range of $10^{-4}$ and $10^{-6}$, comparatively short measurement times become feasible in contrast to hitherto existing fitting methods, in which there were to measure BER values down to $10^{-12}$ reflecting rare occurrences of transition events in order to, e.g., obtain sufficiently reliable results for the individual jitter histogram representations.

Random jitter is assumed to cause a Gaussian type probability distribution of transition events that is unbounded in time and being centered at the expected transition, if deterministic jitter is absent. The amount of random jitter is related to the standard deviation of the distribution function. However, in case that deterministic jitter is present, the distribution function splits into two separated Gaussian peaks by means of convolution of two Dirac peaks representing two bounded levels of deterministic events with said Gaussian type probability distribution. The corresponding BER characteristic is therefore equivalent to the integral of this convoluted function. The amount of deterministic is related to the distance of the two peaks.

What is derived in the polynomial fit to the BER according to the present invention are polynomial coefficients. These are evaluated to identify the amount each of random jitter and deterministic jitter, separately.

In a preferred embodiment the bit error rate values measured are transformed prior to being fitted with a polynomial function. In this transformation advantage is taken of the form of the cumulative distribution function, i.e. BER characteristic, which can be approximated by a linear regression for BER values lower than a threshold of, e.g., $10^{-4}$, if at first the, e.g. decadic logarithm is taken of bit error rate values and at second a square root is taken of the values such derived. The slope and, e.g., the crossover of the resulting trend- or regression line with the ordinate axis can be analyzed and used to determine and separate random (slope, or first order polynomial) and deterministic jitter (ordinate axis crossover, or zeroth order polynomial), respectively.

The invention can be partly or entirely embodied or supported by one or more suitable software programs, which can be stored on or otherwise provided by any kind of data carrier, and which might be executed in or by any suitable data processing unit. Software programs or routines are preferably applied to processing units of commonly available Bit Error Rate Testers (BERT). As a consequence of the short measurement times provided by the present invention in situ output of jitter analysis results is enabled rather than spending efforts in performing a costly post-processing analysis, separately.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference signs.

DETAILED DESCRIPTION OF PREFERRED EMBODIMENTS OF THE INVENTION

Figure 1:
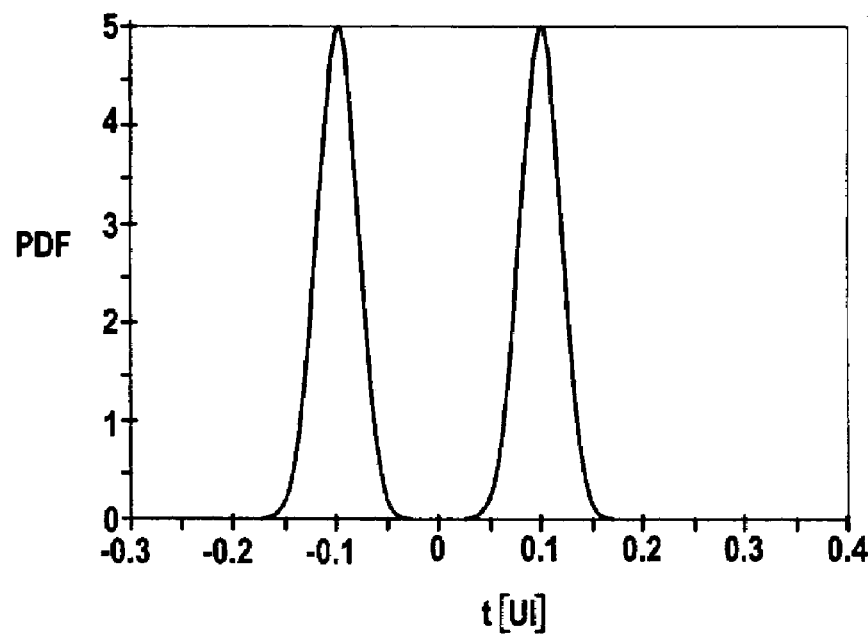
FIG. 1 shows a probability distribution histogram for transitions of a logical level of a digital signal with respect to an ideal timing event.

For simplicity and clarity reasons, in what follows theoretical data representations have been chosen to demonstrate the present invention. However, it is clear to the person skilled in the art, that the invention can advantageously be applied to actually measured data distributions as well. In the drawings, the theoretical—or equivalently: measured—data representations are marked with an "m", while polynomial fits are marked with an "f", respectively.

FIG. 1 shows a theoretical probability distribution histogram for transitions of a logical level of a digital signal with respect to an ideal timing event vs. time units UI, wherein 1.0 UI is the length of a bit window. Due to the presence of random as well as deterministic jitter a bimodal distribution that is approximately symmetric about the ideal timing event (t=0) occurs. Integrating this probability distribution function (PDF) with respect to time t, the cumulated distribution function—or bit error rate (BER) function can be obtained, which is displayed in FIG. 2.

Since the probability density function of such a bimodal jitter is represented by two Dirac peaks the overall jitter distribution is a sum of two Gaussian PDF's resulting from the convolution of the Gaussian shape with the Dirac pulses:

$$PDF = \frac{1}{4}\frac{1}{\sqrt{2\pi}\cdot\sigma_1}e^{-\frac{(x-\mu_1)^2}{2\sigma_1^2}} + \frac{1}{4}\frac{1}{\sqrt{2\pi}\cdot\sigma_2}e^{-\frac{(x-\mu_2)^2}{2\sigma_2^2}},$$

wherein $\sigma_1=\sigma_2$ is the standard deviation representing the random jitter, x refers to the time variable, and $\mu_1, \mu_2$ are the deviations from an ideal timing event resulting from deterministic jitter. In this model representation, typical values for $\sigma_1=\sigma_2=0.02$ UI (random jitter), and $\mu_1=-\mu_1=0.1$ UI and $\mu_2-\mu_1=0.2$ UI (deterministic jitter have been applied).

Figure 2:
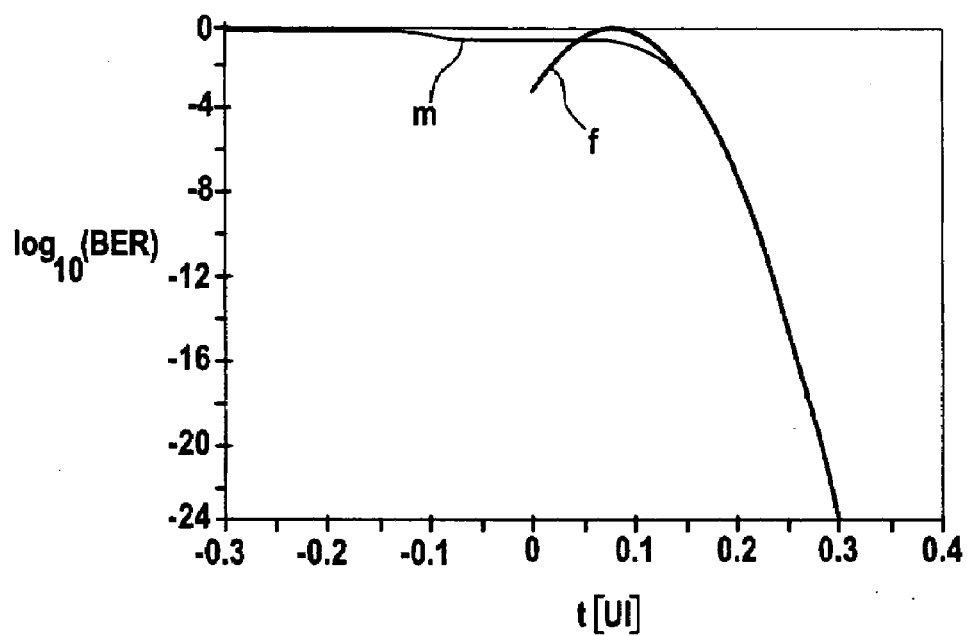
FIG. 2 shows a cumulative BER function of the histogram curve as measured (thin line) being displayed in FIG. 1 in logarithmic representation, and a polynomial fit to the data (bold line)

The bit error rate values displayed as the thin line in FIG. 2 have been transformed into a logarithmic form, $\log_{10}$ (BER). As can be inferred from the functional behavior of the analytical expression of the PDF, a second order polynomial can easily be fitted to the logarithmized form of the BER for at least larger values of the time coordinate (bold line).

Figure 3:
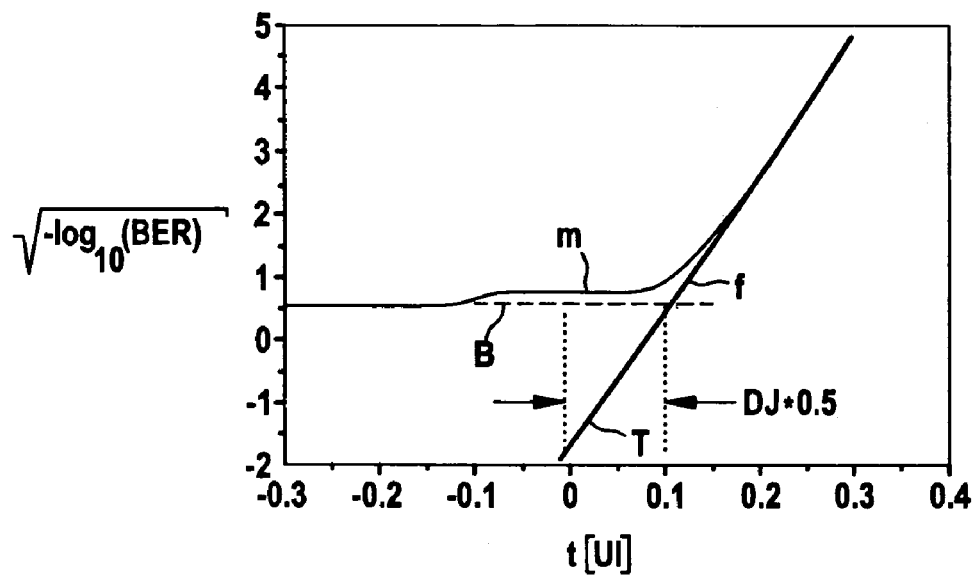
FIG. 3 shows the cumulative BER function as displayed in FIG. 2, but transformed by changing sign and square rooting the data as measured (thin line) and as those fitted (bold line)

In order to linearize the fit, a further transform is applied by square rooting the bit error rate values, after changing the sign of the logarithmized values. The result is shown in FIG. 3. The polynomial fit (bold line) is derived by using bit error rate values selected from a time interval between 0.18 UI and 0.40 UI—or a 0.08 UI to 0.30 UI time distance after the actual occurrence of the second Dirac peak that is due to deterministic jitter. Since the interval is to be adapted to the actual amount of random jitter, i.e. the value of said standard deviation σ, an iterative procedure pre-setting a first reasonable guess of a standard deviation and then refining the interval appropriately. In the present case the interval starts at 4 σ.

Figure 4:
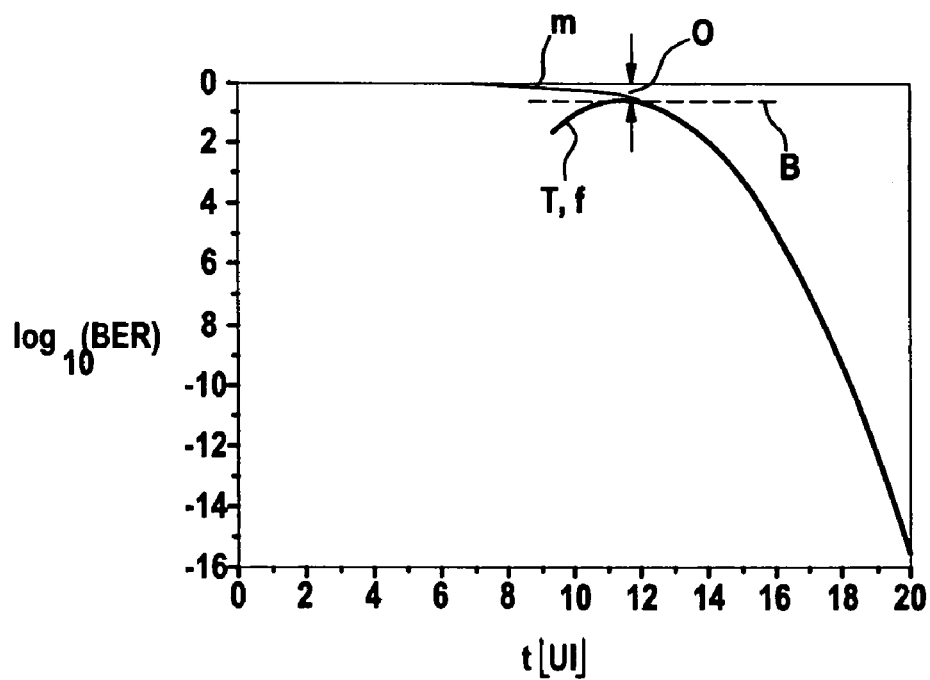
FIG. 4 shows the cumulative BER function as displayed in FIG. 2, but a polynomial fit (bold line) performed considering an offset of the baseline.

Due to deterministic jitter the quadratic portion of the Gauss-profile is shifted to the right by the amount of $\mu_1$, which can be seen in FIG. 4. The vertical shift of the quadratic section is small, which is marked with an "O" in FIG. 4. When we deploy the technique of taking the square root of the graph in FIG. 2 we neglect in this embodiment a small vertical offset of this quadratic portion. However, on the one hand side, it has been found that this will introduce only negligible errors to the individual jitter determinations, on the other hand side a more detailed analysis regarding this offset we be given below in another embodiment.

Therefore, a trendline T fit by linear regression is enabled and an approximation of the BER section assumed to show quadratic behaviour, i.e. larger than 0.08 UI in the present example, to the logarithmic representation of the BER is carried out. An extraction of the amount of random jitter can simply be performed by determining the slope of the trendline T and then relating the slope to the argument of a complementary error function (erfc), which gives an analytical expression of one of the integrated Gaussian profiles, i.e. an idealized BER in the absence of deterministic jitter:

$$BER = \frac{1}{4}erfc\left(\frac{x-\mu}{\sqrt{2}\cdot\sigma}\right)$$

Or equivalently, an assumption is made, that the contribution of the first probability peak to the tail of the second peak is negligible. Under this assumption, a relationship between the slope of the trendline T determined according to the fit and the standard deviation σ can be established. In this embodiment, a σ-value of 0.0198 UI is recovered, which is in close agreement with the value of 0.02 input to the theoretical PDF.

With respect to the determination of the amount of deterministic jitter the zeroth order coefficient of the trendline T is considered: in case of jitter only being represented by random jitter the line would intersect the ordinate axis at approximately the baseline B of the BER characteristic, i.e. at the value of sqrt($-\log_{10}(0.5)$)=0.54866 (Note that the probability of an event occurring at all is just 0.5 and not 1). If deterministic jitter DJ is present, the quadratic section of the BER is shifted, and the crossover points of the trendline T with the ordinate axis as well as the baseline B change. The latter crossover point gives a measure for deterministic jitter DJ on the time axis. This crossover point can easily be derived from the trendline T and then be identified with $\mu_1$. Without restriction the opposite boundary of a data eye can be treated in the same way thus obtaining $\mu_2$. The result is graphically displayed in FIG. 3. In spite of the small offset mentioned above, a deterministic jitter $\mu_2-\mu_1=0.2$ UI is also approximately recovered as it has been input for the present test PDF before.

A second, refined embodiment of the invention deals with fitting an n-th order polynome to the BER. Doing this said small offset due to interpolating the quadratic function with its top touching a baseline B with a $\log_{10}(BER)$ level of 0 (probability of an event equals 1) according to the previous embodiment can be accounted for. The polynomial function to be fitted to the BER reads as:

$$\varphi(x)=a_0+a_1x+\ldots+a_mx^n.$$

To determine the coefficients the method of least mean squares can be used. In order to keep the computational effort limited a restriction to a quadratic function seems to be sufficient:

$$\varphi(x)=a_0+a_1x+a_2x^2$$

The linear equation system that needs to be solved takes the following form:

$$a_0(n+1)+a_1\sum_{i=0}^{n}x_i+a_2\sum_{i=0}^{n}x_i^2=\sum_{i=0}^{n}y_i,$$

$$a_0\sum_{i=0}^{n}x_i+a_1\sum_{i=0}^{n}x_i^2+a_2\sum_{i=0}^{n}x_i^3=\sum_{i=0}^{n}x_iy_i,$$

$$a_0\sum_{i=0}^{n}x_i^2+a_1\sum_{i=0}^{n}x_i^3+a_2\sum_{i=0}^{n}x_i^4=\sum_{i=0}^{n}x_i^2y_i,$$

$$P_i=(x_i,y_i), i=0,\ldots,n$$

wherein the $P_i$ are the measured data points used for the fit. The equation system can be solved according to Cramer's rule.

According to this embodiment the trendline T is computed by applying a coordinate transform of the fitted quadratic function with the goal of translating the origin to the summit of the parabola that represents the second order polynomial fit function. Thereafter the same technique of deriving the random and deterministic jitter is deployed in the shifted coordinate system as it was the case in the simpler version of the previous embodiment.

Figure 5:
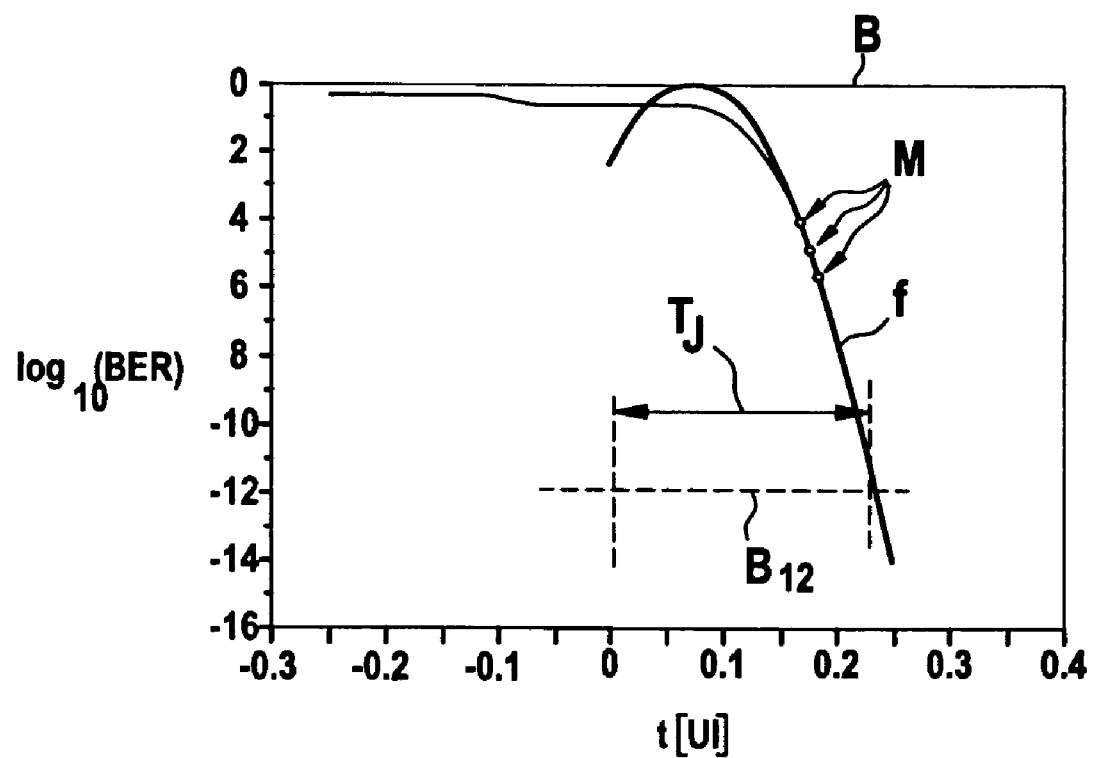
FIG. 5 shows the cumulative BER function as displayed in FIG. 2, but compared with actually measured data of three timing points used as input for the polynomial fit (bold line) for determining total jitter.

What is important for the measurement time is the fact that by applying the method of the present invention one is able to represent the random jitter characteristic by means of a quadratic approximation, while the method also allows an extrapolation in order to extract an amount of total jitter TJ at a given BER level. By just taking a few measurement data, e.g., at a BER of between $10^{-4}\ldots10^{-6}$, and then to extrapolate for the total jitter at a second baseline $B_{12}$ having a BER-value of $10^{-12}$, measurement time is considerably reduced. An embodiment considering this approach is illustrated in FIG. 5. The polynomial fit of second order is applied to BER-measurements (reference numeral "M" in FIG. 5) taken at three timing points. No offset has been considered in this embodiment. The theoretical curve regarded as being "measured" in this document is once more displayed as a thin line for comparison.

The invention claimed is:

1. A method for determining the amount of deterministic jitter and random jitter in a digital signal having transitions between logical levels, the method comprising the steps of:
   a) determining a plurality of bit error rate values, each bit error rate value being associated with one of a plurality of successive timing points,
   b) applying a polynomial fit to said plurality of bit error rate values associated with said timing points for determining a number of polynomial coefficients of said polynomial fit, and
   c) deriving the amount each of said deterministic and said random jitter from said polynomial coefficients.

2. The method according to claim 1,
wherein each bit error rate value is derived from a comparison of a result of a detection of a transition occurring in the digital signal cumulatively prior to its associated timing point with an expected signal.

3. The method according to claim 1,
wherein said polynomial fit is applied to said plurality of bit error rate values with respect to the time coordinate.

4. The method according to claim 1,
wherein prior to applying said polynomial fit, each of said bit error rate values is transformed by:
   (1.) calculating a negative logarithm of each of said determined bit error rate values,
   (2.) calculating a square-root of each of said bit error rate values calculated in step (1.).

5. The method according to claim 4,
wherein said polynomial fit to said transformed bit error rate values is of first order in time for providing a trendline to the bit error rate value data.

6. The method according to claim 5, wherein:
a first constant baseline corresponding to a probability of an occurrence of a bit error event of 0.5 is determined;
said trendline is extrapolated to determine a crossover point with said constant baseline;
a timing point is determined being associated with said crossover point;
the amount of deterministic jitter is derived from a comparison of said determined timing point with an expected timing point for a logical level transition of said digital signal.

7. The method according to claim 5, wherein:
a slope of said trendline is determined,
the amount of random jitter is calculated from said slope.

8. The method according to claim 5,
wherein an amount of total jitter is determined from extrapolating said trendline to a crossover point with a second baseline being associated with a bit error rate value of $10^{-12}$.

9. The method according to claim 1,
wherein said polynomial fit to said bit error rate values is performed by means of linear regression.

10. Method according to claim 8,
wherein each of said timing points is selected such as to provide bit error rate values, which are prior to performing any transformation larger than $10^{-6}$ and smaller than $10^{-4}$.

11. Method according to claim 10,
wherein three timing points are selected to determine three bit error rate values.

12. The method according to claim 1,
wherein said polynomial fit is of second order.

13. An arrangement for determining the amount of deterministic jitter and random jitter in a digital signal having transitions between logical levels, comprising:
- a measurement unit for determining a plurality of bit error rate values, each bit error rate value being associated with one of a plurality of successive timing points,
- a data processing unit capable of applying a polynomial fit to said plurality of bit error rate values associated with said timing points for determining a number of polynomial coefficients of said polynomial fit, and for deriving the amount each of said deterministic and said random jitter from said polynomial coefficients.

14. A bit error rate tester, comprising:
- a measurement device for measuring a plurality of bit error rate values in a digital signal having transitions between logical levels, each bit error rate value being associated with one of a plurality of successive timing points,
- a data processing unit capable of applying a polynomial fit to said plurality of bit error rate values associated with said timing points for determining a number of polynomial coefficients of said polynomial fit, and for deriving the amount each of deterministic and random jitter from said polynomial coefficients.

15. A program storage medium, preferably stored on a data carrier, embodying a program of instructions executable on a data processing system such as a computer to perform method steps for determining the amount of deterministic jitter and random jitter in a digital signal having transitions between logical levels, said method steps comprising:
- a) determining a plurality of bit error rate values, each bit error rate value being associated with one of a plurality of successive timing points,
- b) applying a polynomial fit to said plurality of bit error rate values associated with said timing points for determining a number of polynomial coefficients of said polynomial fit, and
- c) deriving the amount each of said deterministic and said random jitter from said polynomial coefficients.

* * * * *